Nov. 15, 1938.  A. R. WURTELE  2,136,960
INTERNAL COMBUSTION ENGINE
Filed Sept. 26, 1935

INVENTOR.
Allan R. Wurtele
BY
L. Bascom Smith
ATTORNEY

Patented Nov. 15, 1938

2,136,960

UNITED STATES PATENT OFFICE 2,136,960

INTERNAL COMBUSTION ENGINE

Allan R. Wurtele, New Roads, La.

Application September 26, 1935, Serial No. 42,195

5 Claims. (Cl. 123—32)

This invention relates to internal combustion engines and more particularly to engines of the solid fuel injection type.

One of the objects of the present invention is to provide in combination with an internal combustion engine novel means for operating auxiliaries employed therewith.

Another object of the invention is to provide a novel crankshaft for an internal combustion engine.

Still another object is to provide a novel internal combustion engine which is so constructed that the same consumes minimum space per unit of power output for engines of the solid fuel injection type.

A further object is to provide novel means for introducing lubricating oil under pressure into a rotating shaft supported by roller bearings.

A still further object is to provide novel means for absorbing longitudinal thrust on a rotating shaft.

The above and further objects and novel features of this invention will more fully appear from the following detailed description taken in connection with the accompanying drawings. It is to be expressly understood, however, that the drawings are for the purpose of illustration only and are not designed as a definition of the limits of the invention, reference being primarily had for this purpose to the apperded claims.

Figure 1:
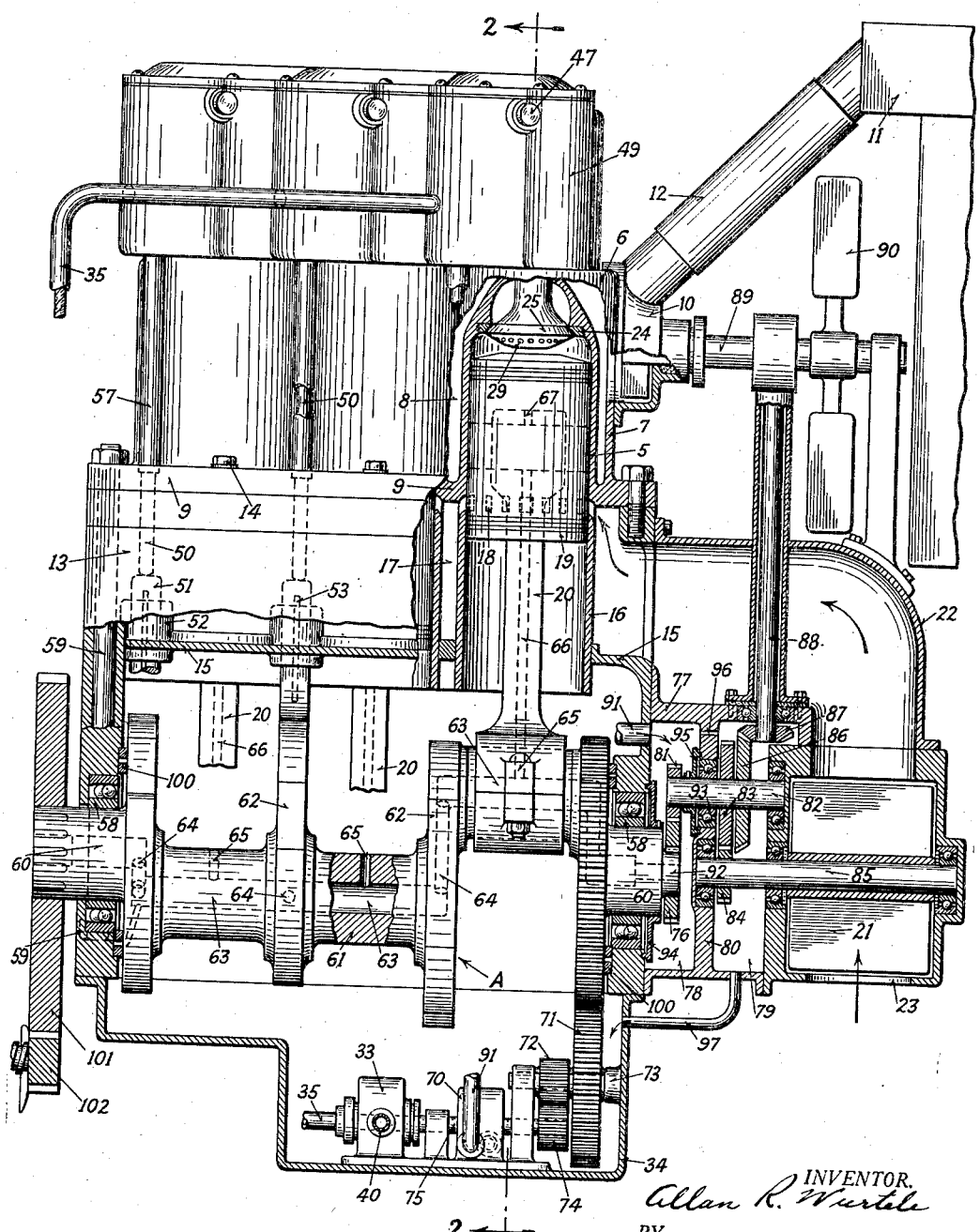
Figure 2:
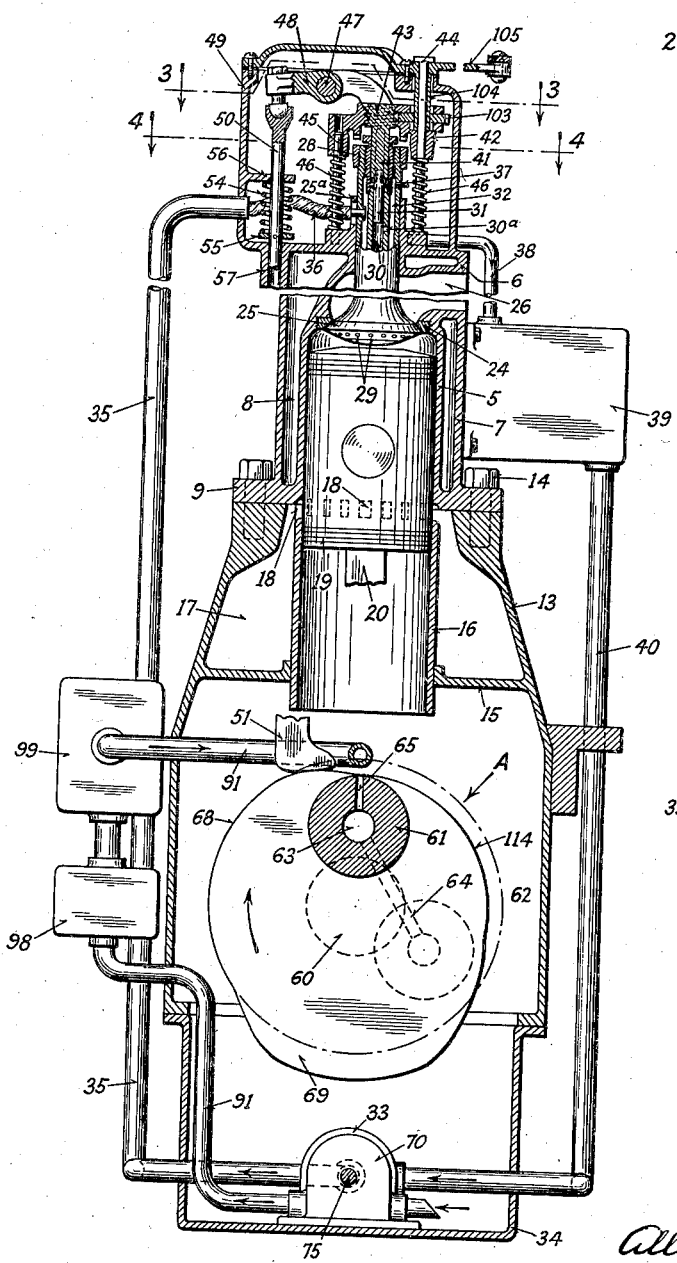
Figure 3:
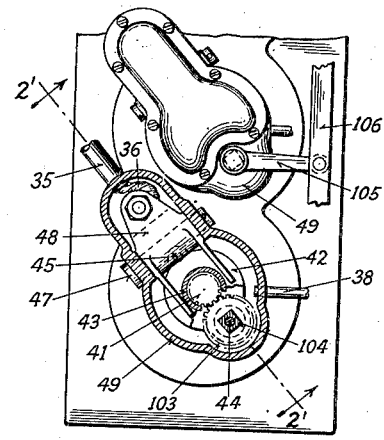
Figure 4:
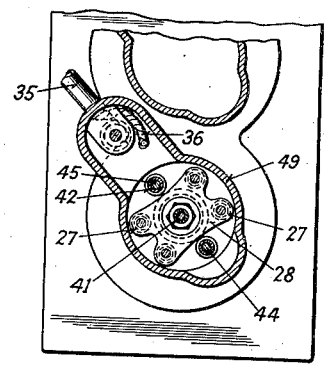

In the accompanying drawings, wherein like reference characters refer to like parts throughout the several views, Fig. 1 is a side elevation, partly in section and with parts broken away, of an engine embodying the present invention;

Fig. 2 is a section, with parts broken away, the lower portion of which is taken on line 2—2 of Fig. 3, and the upper portion, constituting a valve and fuel pump assembly, is a section taken on line 2'—2' of Fig. 3;

Fig. 3 is a top plan, partly in section and with parts broken away, taken substantially on line 3—3 of Fig. 2; and Fig. 4 is a sectional view, with parts broken away, taken on line 4—4 of Fig. 2, Only one embodiment of this invention is shown, by way of example, in the form of a three-cylinder, two-cycle, exhaust-valve-in-head engine adapted for use in automotive vehicles, wherein a novel combined cylinder and frame construction is provided and in which the cylinders may be partially air and partially water cooled. As shown, power cylinders 5 (Fig. 2) are cast integrally with cylinder heads 6 and water jacket 7, the latter surrounding the upper portion of all of the cylinders to form a unitary cooling chamber 8, the bottom of which is constituted by a flange 9. A pump 10 (Fig. 1) is provided for circulating a cooling fluid through chamber 8, said pump being connected to the top of a radiator 11 by means of a pipe 12.

The above structure is supported on frame 13, being secured thereto by any suitable means, such as bolts 14. Frame 13 is provided with an internal flange 15 having openings in which the lower ends of the skirts 16 of cylinders 5 have an air-tight fit. An air supply and cooling chamber 17 is thus provided which is common to all cylinders, said chamber communicating with cylinders 5 through a plurality of circumferentially arranged ports 18 in the walls of said cylinders when pistons 19, operating in the latter, are at the bottoms of their strokes. Pistons 19 are operatively connected to a novel crankshaft A, to be hereinafter described in detail, by means of connecting rods 20. Air under pressure is supplied to chamber 17 by a blower 21 (Fig. 1) through conduit 22, said blower having an intake 23 and being adapted to be driven by novel means to appear hereafter.

The upper end of cylinder 5 is provided with an exhaust port surrounded by a removable valve seat 24. A valve 25 is adapted to cooperate with said seat to control the passage of exhaust gases from cylinder 5 through passage 26, said valve being normally held against seat 24 by a plurality of springs 27 (Fig. 4) interposed between cylinder head 6 and a flange 28 threaded on the upper end of the valve stem. Valve 25 is preferably provided with a precombustion chamber (not shown) in the enlarged head portion thereof, said chamber being in constant communication with cylinder 5 by means of a plurality of orifices 29. Measured quantities of fuel are supplied to the precombustion chamber by suitable pump means within the valve, said valve and pump means being adapted to be actuated by means including cams on crank shaft A. Fuel is preferably supplied to the pump means, which includes a cylinder 30 having a radial port 30a and a plunger 31, from an annular chamber 32 formed in the valve stem, through which the fuel circulates, thus cooling the valve and preheating the fuel. A fuel feed pump 33, mounted in the crankcase 34, which is in turn secured to frame 13, pumps liquid fuel through conduit 35 and flexible conduit 36 to cooling chamber 32, said flexible conduit preferably extending through a slot in valve guide 25a. That portion of the fuel which is not pumped into cylinder 5 by pump 30, 31, flows out through connection 37 and a pipe 38 to sump tank 39, which is connected to pump 33 by pipe 40. Tank 39 may be connected to a suitable source of fresh fuel supply (not shown).

Means are provided for actuating pump plunger 31 and exhaust valve 25, such means as shown being constituted by a member 41 which is connected to and forms an extension of said plunger, said member having a follower block 42 mounted thereon by means of screw threads 43, said threads constituting cam means. Follower block 42 is held against rotary movement by a pair of diametrically disposed guide rods 44 and 45, which rods are secured to cylinder head 6 and slidably extend through openings in said block to permit vertical movement of the latter. Springs 46, surrounding guide rods 44 and 45 and interposed between cylinder head 6 and follower block 42, hold the latter in engagement with the inner bifurcated end of a rocker arm 48, which is pivotally mounted on a pin 47 supported in housing 49. Plunger 31, 41 is thus also normally held in raised position with the lower end thereof above port 30a to permit the entrance of fuel from chamber 32 into cylinder 30. Rocker arm 48 is adapted to be actuated by a push rod 50 engaging the outer end thereof, said rod in turn engaging a cam follower 51. The latter slidably extends through a sleeve 52 (Fig. 1) supported by flange 15, said follower being held against turning movement therein by any suitable means such as a key 53. The lower end of follower 51 is held in engagement with a cam surface on crankshaft A by a spring 54 interposed between a flange 55 on rod 50 and a shelf 56 in housing 49. The portions of rods 50 extending from housing 49 to flange 9 may be enclosed in tubular members 57.

A novel combination cam-crankshaft is provided whereby the over-all length of the engine is materially decreased, the weight of said crankshaft being so distributed as to form a balanced shaft and so as to obviate the necessity for a flywheel. The cheeks connecting the crankpins are employed as cams, thus eliminating the necessity for a separate camshaft and obtaining more work per unit of weight from the crankshaft itself. In the form shown, the novel crankshaft provided is constituted by a steel casting rotatably supported on two main bearings 58, preferably of the ball or roller type, the lower bearing caps being held in place and supported by bolts 59 (Fig. 1), the upper ends of which engage cylinder flange 9. The main bearing journals 60 and crankpins 61 are joined together by discs or cheeks 62 on the periphery of which are formed cam surfaces for controlling the operation of exhaust valves 25 and fuel pumps 30, 31 through the connections heretofore described.

Crankpins 61, to which connecting rods 20 are operatively secured, are cast with central passages 63 therein, the latter being of such diameter as to make the metal thickness of said pins correspond to the metal thickness of cheeks 62. The casting being thus of substantially uniform thickness throughout will cool uniformly, thereby avoiding the usual weaknesses brought about by non-uniform cooling periods for different portions of a single casting. Bores 63 are connected by passages 64 in cheeks 62 to form a pressure lubrication conduit through the crankshaft. A lubricating medium is supplied to said conduit through the right-hand end of crankshaft A by novel means to appear hereafter, said medium being thereafter forced through passages 65 to lubricate the crankpin bearings, thence through central bores 66 in connecting rods 20 to lubricate the wristpin bearings, a portion of the oil being sprayed through openings 67 to aid in cooling the crown of piston 19.

As pointed out above, the peripheral surfaces of cheeks 62 constitute cams, there being in the present embodiment two cams 68 and 69 (Fig. 2) on each of three of said cheeks for operating the exhaust valves 25 and fuel pumps 30, 31 respectively. In order to balance the entire crankshaft, each of the larger cams 69 is placed diametrically opposite a crankpin 61, thus counterbalancing said crankpin. Furthermore, the cams on the various cheeks are spaced at 120 degree angles, thereby distributing the weight equally about the axis of the shaft.

By thus constructing the crankshaft, it will be noted that a larger percentage of the weight of the same is located at a substantial radial distance from the axis of rotation of the shaft. The necessity for a flywheel is accordingly avoided, and the torsional stresses ordinarily set up in shafts by a flywheel mounted near the end thereof are eliminated. Since the engine herein provided operates on the two-cycle principle, there are three explosions for each revolution of the crankshaft, the same number as in a six-cylinder engine operating on a four-cycle principle, and smoothness of operation is assured.

Another distinct advantage of the novel cam-crankshaft construction herein provided resides in the fact that the provision of large diameter cams is rendered practical. A longer cam surface may thus be employed to attain a given cam rise during a given angle of shaft rotation. Smooth valve and fuel pump actuation is thereby obtained in lieu of the violent destructive action of the smaller and sharper cams now in common use, particularly in two-cycle engines, wherein the exhaust valve is actuated on each stroke of the power piston. Also, the increased peripheral length of the cams permits greater valve lift as well as longer maximum full open condition of the valves and renders the provision of at least two cams on a single disc practicable.

Since only three cam surfaces are required in the present engine, the remaining cheek, i. e. the one at the right-hand end of the crankshaft, as seen in Fig. 1, is provided with gear teeth for driving auxiliaries. In the present embodiment, fuel feed pump 33 and lube oil pump 70 are driven by said gear through pinions 71 and 72 on a stub shaft 73 and pinion 74 on shaft 75. Pumps 33 and 70 are driven directly from the latter shaft.

For driving the other auxiliaries, a gear member 76 is keyed to the right-hand end of the crankshaft, said gear being enclosed in a housing 77 secured to the engine crankcase, which housing is divided into two compartments 78 and 79 by a partition or flange 80. Blower 21 is preferably driven from gear 76 through a gear 81 rigidly secured to a lay shaft 82, which is rotatably mounted on ball bearings in housing 77. A second gear member 83 on said shaft meshes with a gear 84 on blower shaft 85. A bevelled gear 86, secured to shaft 82, meshes with pinion 87 on a vertical shaft 88, which latter is drivably connected to a shaft 89 by any suitable means to thereby operate water pump 10 and a fan 90.

In engines now in common use which employ forced lubrication through the crankshaft, the oil is introduced into said crankshaft through a bearing cap. The novel means provided by the present invention for this purpose render possible the use of roller bearings for the crankshaft, thereby contributing to greater efficiency and smoothness of operation. As shown, lube oil is pumped through conduit 91 into compartment 78 of housing 77, whence it enters crankshaft A through a central opening 92 in the end of the latter. The leakage of oil from compartment 78 or the release of pressure therein through bearings 58 and 93 is substantially prevented by suitable flanged discs or flingers 94 and 95 secured to shafts A and 82 respectively, for rotation therewith, the centrifugal action of said flinger preventing the flow of oil by the same. Some oil is permitted to flow into compartment 79 for lubrication purposes through a small opening 96, this oil returning to crankcase 34 through a conduit 97, where it is again picked up by pump 70. A lubricating oil cooler 98 (Fig. 2) and a strainer 99 may be placed in the lubrication system if desired. Like apparatus may also be employed in the fuel oil system.

Novel thrust bearings are provided for crankshaft A whereby the usual thrust bearing equipment outside of the engine crankcase in marine installations may be omitted. As shown, the novel bearings comprise annular bearing shoes 100 supported in the ends of frame 13 and the main bearing caps, the same being adapted to be engaged by the outer surfaces of the outer cheeks 62 on the crankshaft.

Suitable means may be provided for starting the engine by power apparatus, such means as shown being constituted by a gear 101 splined or otherwise suitably secured to the left-hand end of crankshaft A, said gear being adapted to be operatively engaged by suitable starting mechanism 102, only a portion of which is shown.

Novel means are provided for controlling the size of fuel charge injected into cylinder 5 by pump 30, 31 to thereby control the speed of operation of the engine. Such means as shown comprises a gear member 103 supported in a slot in follower block 42 and adapted to mesh with gear teeth cut on cam threads 43 (Fig. 3). Gear 103 is adapted to be rotated by a vertical sleeve 104 extending therethrough and journalled on guide rod 44. Sleeve 104 projects upwardly through the top of housing 49, the upper end thereof being provided with a laterally extending arm 105. Movement of said arm, therefore, will impart rotary movement to gear 103, which in turn will rotate member 41 relative to block 42, the latter being held against rotary movement by rods 44 and 45. Cam threads 43 are thereupon effective to raise or lower plunger 31, 41 relative to block 42 and pump cylinder 30, depending on the direction of movement of arm 105, thereby altering the effective pumping stroke of fuel pump plunger 31, i. e. the stroke of said plunger below port 30a. Preferably, arms 105 of the several cylinders are pivotally connected at the outer ends thereof by a rod 106, in order that equal quantities of fuel will be injected into each of the power cylinders.

In operation, crankshaft A is rotated by the reciprocation of pistons 19, which movement is brought about in the following manner: Assume that one of the pistons 19 is on its up stroke with cam follower 51 riding on the base circle 114 of cam cheek 62 (Fig. 2). As piston 19 nears the top of its stroke, follower 51 engages cam 68, thereby actuating plunger 31 of the fuel pump 30, 31 through the connections consisting of push rod 50, rocker arm 48, and threaded block 42. Fuel is thus forced into the precombustion chamber within valve 25 and is ignited by the heat of compression of the air in cylinder 5. The burning fuel expands through orifices 29 into the power cylinder where burning is completed, driving piston 19 downwardly. As said piston nears the bottom of its stroke, cam follower 51 engages cam 69, whereupon block 42 is moved into engagement with the upper end of valve 25, thereby opening the latter against the pressure of springs 27, permitting the spent gases to escape through passage 26. On further downward movement of piston 19, ports 18 are uncovered, permitting air under pressure from chamber 17 to thoroughly scavenge cylinder 5, exhaust valve 25 remaining at full open position during the time follower 51 engages cam 69. Said follower rides down off cam 69 shortly after piston 19 reaches the bottom of its stroke and starts upwardly, permitting valve 25 to close before closure of ports 18. Cylinder 5 is thereby supercharged to the extent of the pressure in chamber 17. As soon as ports 18 are covered by piston 19, the air in cylinder 5 is compressed and another cycle is begun. The speed of the engine, as heretofore pointed out, is controlled by the manual movement of rod 106, which is effective to rotate gear 103 and member 41, thereby raising or lowering plunger 31 relative to port 30a. Blower 21, fan 90, water pump 10, fuel pump 33, and lube oil pump 70 will be driven from crankshaft A through gears 71 and 76 as above pointed out whenever the engine is in operation.

There is thus provided a novel, simplified internal combustion engine embodying a number of novel means which cooperate one with the other to greatly reduce the size and weight per unit of power output and to increase the smoothness of operation and efficiency. The novel crankshaft provided renders possible a large reduction in over-all length of the engine, making it practical to employ but two main bearings and to place the cylinders in closer relation to one another, thus facilitating the supply of scavenging and supercharging air to said cylinders from a common air supply chamber. Furthermore, the combination of exhaust valve and fuel pump construction with the novel cam-crankshaft, whereby the operation of each of said valves and pumps may be controlled by a single cam member, reduces the number of parts, increases efficiency and affords cams of greatly increased diameter, thereby improving valve action with resultant smoother performance. The novel crankshaft is also so constructed as to be inherently in substantial balance when mounted and so as to perform the function of the flywheel ordinarily employed. The novel means provided for introducing lubricating oil under pressure into the hollow crankshaft makes it possible to mount the latter on roller or ball bearings.

Although only one embodiment of this invention is illustrated and described, it is to be expressly understood that the same is not limited thereto, but that various changes may be made. For example, additional power cylinders may be employed if desired and changes may be made in the details of the valve and fuel pump assembly. Other changes may be made in the design and arrangement of parts illustrated, to adapt the engine for various uses, such as marine, without departing from the spirit of the invention, as will now be apparent to those skilled in the art, and reference will be primarily had to the appended claims for a definition of the limits of the invention.

What is claimed is:

1. In an internal combustion engine, a power cylinder having a port, a valve for said port, pump means for injecting fuel into said cylinder, means for actuating said valve and pump means including a crankshaft having disc-like cheeks connecting the crankpins and main bearing journals thereof, one of said cheeks having an irregular peripheral surface, and force transmitting means interposed between said last named cheek and said valve and pump means whereby the latter are actuated in timed relation to one another.

2. In an internal combustion engine, a plurality of power cylinders, a piston reciprocable in each of said cylinders, a water jacket surrounding the upper portion of said cylinders and forming a common water jacket therefor, means constituting a common chamber surrounding the lower portion of all of said cylinders, the latter having communication therewith through ports in the cylinder walls adapted to be covered by said pistons, a blower for supplying air under pressure to said last named chamber, and means for driving said blower.

3. In an internal combustion engine, a cylinder, an exhaust valve therefor, means including a pump plunger for injecting fuel into said cylinder, a crankshaft having a cam thereon, and a common operating member interposed between said crankshaft cam and the plunger and valve, said member and cam being adapted to actuate said exhaust valve and plunger in timed relation.

4. In a fuel injection engine having an exhaust valve, a crankshaft comprising main bearing journals, crankpins having bores therethrough, and discs integral with and connecting said main journals and crankpins, one of said discs having a plurality of lobes on the periphery thereof constituting cam surfaces for controlling in series the fuel injection and the exhaust valve opening.

5. In an internal combustion engine, a plurality of power cylinders, a water jacket forming a cooling chamber common to all of said cylinders, a jacket forming an air chamber common to all of said cylinders, said air chamber being adapted to communicate with each of said cylinders through openings in the walls of the latter, a crankshaft, pistons in said cylinders operatively connected to said crankshaft and adapted to open and close said openings, and means for supplying cooling and combustion supporting mediums to said cooling chamber and air chamber, respectively, said last-named means including mechanisms driven by the crankshaft.

ALLAN R. WURTELE.